(12) United States Patent
Viswanathan

(10) Patent No.: US 8,790,615 B2
(45) Date of Patent: *Jul. 29, 2014

(54) METHODS OF SYNTHESIZING CARBON-MAGNETITE NANOCOMPOSITES FROM RENEWABLE RESOURCE MATERIALS AND APPLICATION OF SAME

(75) Inventor: Tito Viswanathan, Little Rock, AR (US)

(73) Assignee: Board of Trustees of the University of Arkansas, Little Rock, AR (US)

( * ) Notice: Subject to any disclaimer, the term of this patent is extended or adjusted under 35 U.S.C. 154(b) by 391 days.

This patent is subject to a terminal disclaimer.

(21) Appl. No.: 13/069,097

(22) Filed: Mar. 22, 2011

(65) Prior Publication Data
US 2011/0174738 A1    Jul. 21, 2011

Related U.S. Application Data

(63) Continuation-in-part of application No. 12/487,323, filed on Jun. 18, 2009.

(60) Provisional application No. 61/316,669, filed on Mar. 23, 2010, provisional application No. 61/132,380, filed on Jun. 18, 2008.

(51) Int. Cl.
| | |
|---|---|
| *H01B 1/00* | (2006.01) |
| *H01B 1/04* | (2006.01) |
| *B22F 3/00* | (2006.01) |
| *C08L 79/08* | (2006.01) |
| *B22F 1/00* | (2006.01) |
| *B22F 9/00* | (2006.01) |
| *C22B 5/20* | (2006.01) |
| *G03G 9/00* | (2006.01) |
| *B01J 21/18* | (2006.01) |
| *B01J 37/34* | (2006.01) |
| *C01G 49/02* | (2006.01) |
| *C01G 1/00* | (2006.01) |

(52) U.S. Cl.
USPC .......... 423/632; 423/633; 423/634; 423/138; 252/500; 252/503; 252/62.55; 508/123; 75/345; 75/351; 75/362; 430/111.32; 977/773; 977/788; 502/185; 502/5; 502/180

(58) Field of Classification Search
None
See application file for complete search history.

(56) References Cited

U.S. PATENT DOCUMENTS 3,803,033 A    4/1974   Sutherland
(Continued)

FOREIGN PATENT DOCUMENTS

| CN | 1876566 A | 12/2006 |
|---|---|---|
| CN | 1911792 A | 2/2007 |

(Continued)

OTHER PUBLICATIONS

Antal et al., Flash carbonization of biomass, Industrial & Engineering Chemistry Research, 2003, 42(16), 3690-3699.
(Continued)

*Primary Examiner* — Guinever Gregorio
(74) *Attorney, Agent, or Firm* — Morris, Manning & Martin, LLP; Tim Tingkang Xia, Esq.

(57) ABSTRACT

A method of synthesizing carbon-magnetite nanocomposites. In one embodiment, the method includes the steps of (a) dissolving a first amount of an alkali salt of lignosulfonate in water to form a first solution, (b) heating the first solution to a first temperature, (c) adding a second amount of iron sulfate ($FeSO_4$) to the first solution to form a second solution, (d) heating the second solution at a second temperature for a first duration of time effective to form a third solution of iron lignosulfonate, (e) adding a third amount of 1N sodium hydroxide (NaOH) to the third solution of iron lignosulfonate to form a fourth solution with a first pH level, (f) heating the fourth solution at a third temperature for a second duration of time to form a first sample, and (g) subjecting the first sample to a microwave radiation for a third duration of time effective to form a second sample containing a plurality of carbon-magnetite nanocomposites.

19 Claims, 7 Drawing Sheets

(56) References Cited

U.S. PATENT DOCUMENTS

| | | | |
|---|---|---|---|
| 3,886,093 | A | 5/1975 | Dimitri |
| 4,019,995 | A | 4/1977 | Briggs |
| 4,108,767 | A | 8/1978 | Cooper |
| 4,176,172 | A * | 11/1979 | Bennetch et al. ............. 423/634 |
| 4,414,196 | A * | 11/1983 | Matsumoto et al. .......... 423/633 |
| 4,457,853 | A | 7/1984 | Detroit |
| 4,985,225 | A | 1/1991 | Hashimoto et al. |
| 5,531,922 | A * | 7/1996 | Okinaka et al. ............ 252/62.56 |
| 5,604,037 | A | 2/1997 | Ting |
| 5,972,537 | A | 10/1999 | Mao |
| 6,030,688 | A * | 2/2000 | Hayashi et al. ................ 428/141 |
| 6,099,990 | A | 8/2000 | Denton |
| 6,232,264 | B1 | 5/2001 | Lukehart |
| 6,486,008 | B1 | 11/2002 | Lee |
| 6,616,747 | B2 * | 9/2003 | Sumita .......................... 106/456 |
| 6,733,827 | B2 | 5/2004 | Mitchell et al. |
| 6,764,617 | B1 | 7/2004 | Viswanathan |
| 7,208,134 | B2 * | 4/2007 | Bromberg et al. ......... 423/592.1 |
| 7,220,484 | B2 | 5/2007 | Ton-That |
| 7,297,652 | B2 | 11/2007 | Jhung |
| 7,303,679 | B2 | 12/2007 | Ulicny |
| 7,358,325 | B2 | 4/2008 | Hayes |
| 7,758,756 | B2 | 7/2010 | Kim |
| 7,811,545 | B2 * | 10/2010 | Hyeon et al. ............... 423/592.1 |
| 8,167,973 | B2 * | 5/2012 | Viswanathan ................. 75/345 |
| 2002/0064495 | A1 | 5/2002 | Miura et al. |
| 2003/0044712 | A1 * | 3/2003 | Matsui et al. ............ 430/111.32 |
| 2004/0147397 | A1 | 7/2004 | Miller et al. |
| 2005/0139550 | A1 | 6/2005 | Ulicny |
| 2005/0181941 | A1 | 8/2005 | Sugo et al. |
| 2005/0186344 | A1 | 8/2005 | Takagi |
| 2005/0271816 | A1 | 12/2005 | Meschke |
| 2007/0129233 | A1 | 6/2007 | Ueno et al. |
| 2007/0141502 | A1 * | 6/2007 | Aga et al. ................. 430/111.32 |
| 2007/0142225 | A1 | 6/2007 | Baker |
| 2007/0218564 | A1 | 9/2007 | Bachmann et al. |
| 2007/0243337 | A1 | 10/2007 | Xiong |
| 2007/0264574 | A1 | 11/2007 | Kim |
| 2007/0266825 | A1 | 11/2007 | Ripley |
| 2008/0017291 | A1 | 1/2008 | Shin et al. |
| 2008/0160306 | A1 | 7/2008 | Mushtaq et al. |
| 2010/0200501 | A1 | 8/2010 | Hoag |
| 2010/0283005 | A1 | 11/2010 | Pickett et al. |

FOREIGN PATENT DOCUMENTS

| | | |
|---|---|---|
| CN | 101402057 A | 4/2009 |
| WO | 2008127757 A2 | 10/2008 |

OTHER PUBLICATIONS

Bao et al., A novel nanostructure of nickel nanotubes encapsulated in carbon nanotubes, Chemical Communications, Cambridge, United Kingdom, 2003, (2), 208-209.

Bender et al., Total Phosphorous in Residual Materials, In Methods of Phosphorus Analysis for Soils, Sediments, Residuals, and Waters, Pierzynski, G.M., Ed. Southern Cooperative Series Bulletin No. 396. 2000.

Chen et al., Microwave-assisted synthesis of carbon supported Pt Nanoparticles for fuel cell applications, Chemical Communications, Cambridge, United Kingdom, 2002, (21), 2588-2589.

Compere et al., Low cost carbon fiber from renewable resources, Oak Ridge National Laboratory, Oak Ridge TN, USA, International Sampe Technical Conference, 2001, 33, 1306-1314, Society for the Advancement of Material and Process Engineering.

Hu et al., Microwave-assisted synthesis of a superparamagnetic surface-functionalized porous Fe3O4/C nanocomposite, Chemistry—An Asia Journal, 2006, 1(4), 605-610.

Kang et al., Obtaining carbon nanotubes from grass, Nanotechnology, 2005, 16(8), 1192-1195.

Kubo et al., Carbon fibers from Lignin-recyclable plastic blends, Encyclopedia of Chemical Processing, vol. 1, 2003, Sunggyu Lee, CRC Press pp. 317-332.

Lagashetty et al., Microwave-assisted route for synthesis of nanosized metal oxides, Science and Technology of Advanced Materials, 2007, 8(6), 484-493.

Liu, Shuling; Liu, Xinzheng; Xu, Liqiang; Qian, Yitai; Ma, Xicheng. Controlled synthesis and characterization of nickel phosphide nanocrystal. Journal of Crystal Growth (2007), 304(2), 430-434.

Marina Sofos et al., A synergistic assembly of nanoscale lamellar photoconductor hybrids, Nature Materials, 2009, 68-75, vol. 8, Nature Publishing Group.

Mayo JT, Yavuz C, Yean S, Cong L, Shipley H, Yu W, Falkner J, Kan A, Tomson M, Colvin VL, The effect of nanocrystalline magnetite size on arsenic removal, Science and Technology of Advanced Materials (2007), 8(1-2), 71-75.

Meng Qinghan et al., Copper-doped mesoporous activated carbons as electrode material for electrochemical capacitors, Journal of Applied Electrochemistry, 2006, 36(1), 63-67.

Osswald et al., Control of sp2/sp3 Carbon Ratio and Surface Chemistry of Nanodiamond Powders by Selective Oxidation in Air, J. Am. Chem. Soc., 2006, 128(35), pp. 11635-11642.

Oyama, Novel catalysts for advanced hydroprocessing: transition metal phosphides, Journal of Catalysis, 2003, 216 (1-2), 343-352.

Oyama, S. T.; Wang, X.; Requejo, F. G.; Sato, T.; Yoshimura, Y. Hydrodesulfurization of Petroleum Feedstocks with a New Type of Nonsulfide Hydrotreating Catalyst. Journal of Catalysis (2002), 209(1), 1-5.

Oyama, S. Ted; Lee, Yong-Kul. Mechanism of Hydrodenitrogenation on Phosphides and Sulfides. Journal of Physical Chemistry B (2005), 109(6), 2109-2119.

Rao et al., Synthesis of Inorganic Solids Using Microwaves, Chemistry of Materials, 1999, 11(4), 882-895.

Shipley HJ, Yean S, Kan AT, Tomson MB, Adsorption of arsenic to magnetite nanoparticles: effect of particle concentration, pH, ionic strength, and temperature, Environmental Toxicology and Chemistry (2009), 28(3), 509-515.

Vaclavikova M, Gallios GP, Hredzak S, Jakabsky S, Removal of arsenic from water streams: an overview of available techniques, Clean Technologies and Environmental Policy (2008), 10(1), 89-95.

Vivas, N.; Bourgeois, G.; Vitry, C.; Glories, Y.; de Freitas, V., "Determination of the composition of commercial tannin extracts by liquid secondary ion mass spectrometry" J. Sci. Food Agric., 1996, 72, 309-317.

Walkiewicz et al., Microwave heating characteristics of selected minerals and compounds, Minerals & Metallurgical Processing, 1988, 5(1), 39-42.

Wang, Xinjun; Han, Kun; Gao, Youjun; Wan, Fuquan; Jiang, Kai. Fabrication of novel copper phosphide (Cu3P) hollow spheres by a simple solvothermal method. Journal of Crystal Growth (2007), 307(1), 126-130.

Wei Liu et al., A Novel Carbothermal Method for the Preparation of Nano-sized WC on High Surface Area Carbon, Chemistry Letters, 2006, 1148-1149, vol. 35, No. 10, The Chemical Society of Japan, Tsukuba, Japan.

Xie, Songhai; Qiao, Minghua; Zhou, Wuzong; Luo, Ge; He, Heyong; Fan, Kangnian; Zhao, Tiejun; Yuan, Weikang. Controlled synthesis, characterization, and crystallization of Ni-P nanospheres. Journal of Physical Chemistry B (2005), 109(51), 24361-24368.

Xu et al., Preparation and characterization of NiO nanorods by thermal decomposition of NiC2O4 precursor, Journal of Materials Science, 2003, 38(4), 779-782.

Yu et al., Microwaved-assisted synthesis and in-situ self-assembly of coaxial Ag/C nanotubes, Chemical Communications, Cambridge, United Kingdom, 2005, 21, 2704-2706.

Zhang et al., Microwave synthesis of nanocarbons from conducting polymers, Chemical Communications, Cambridge, United Kingdom, 2006, (23), 2477-2479.

Zhu et al., Enhanced field emission from O2 and CF4 plasma-treated CuO nanowires, Chemical Physics Letters, 2006, 419(4-6), 458-463.

* cited by examiner

METHODS OF SYNTHESIZING CARBON-MAGNETITE NANOCOMPOSITES FROM RENEWABLE RESOURCE MATERIALS AND APPLICATION OF SAME

CROSS-REFERENCE TO RELATED PATENT APPLICATION

This application claims the benefit, pursuant to 35 U.S.C. §119(e), of U.S. provisional patent application Ser. No. 61/316,669, filed Mar. 23, 2010, entitled "USE OF MAGNETIC CARBON COMPOSITES FROM RENEWABLE RESOURCE MATERIALS FOR REMOVAL OF ARSENIC FROM CONTAMINATED WATER," by Tito Viswanathan, which is incorporated herein by reference in its entirety.

This application is also a continuation-in-part of U.S. patent application Ser. No. 12/487,323, filed on Jun. 18, 2009, entitled "MICROWAVE-ASSISTED SYNTHESIS OF CARBON AND CARBON-METAL COMPOSITES FROM LIGNIN, TANNIN AND ASPHALT DERIVATIVES AND APPLICATIONS OF SAME" by Tito Viswanathan, which is incorporated herein by reference in its entirety, and itself claims the benefit, pursuant to 35 U.S.C. §119(e), of U.S. provisional patent application Ser. No. 61/132,380, filed Jun. 18, 2008, entitled "MICROWAVE-ASSISTED SYNTHESIS OF CARBON AND CARBON-METAL COMPOSITES FROM LIGNIN, TANNIN AND ASPHALT DERIVATIVES," by Tito Viswanathan, which is incorporated herein by reference in its entirety.

This application is related to copending U.S. patent application which is filed concurrently with this application on Mar. 22, 2011, entitled "MICROWAVE-ASSISTED SYNTHESIS OF CARBON NANOTUBES FROM TANNIN, LIGNIN, AND DERIVATIVES," by Tito Viswanathan, which is incorporated herein by reference in its entirety, and itself claims the benefit, pursuant to 35 U.S.C. §119(e), of U.S. provisional patent application Ser. No. 61/316,682, filed on Mar. 23, 2010, entitled "MICROWAVE-ASSISTED SYNTHESIS OF CARBON NANOTUBES FROM TANNIN, LIGNIN, AND DERIVATIVES," by Tito Viswanathan, which is incorporated herein by reference in its entirety.

This application is related to copending U.S. patent application, which is filed concurrently with this application on Mar. 22, 2011, entitled "MICROWAVE-ASSISTED SYNTHESIS OF NANODIAMONDS FROM TANNIN, LIGNIN, ASPHALT AND DERIVATIVES," by Tito Viswanathan, which is incorporated herein by reference in its entirety, and itself claims the benefit, pursuant to 35 U.S.C. §119(e), of U.S. provisional patent application Ser. No. 61/316,654, filed Mar. 23, 2010, entitled "MICROWAVE-ASSISTED SYNTHESIS OF NANODIAMONDS FROM TANNIN, LIGNIN, ASPHALT AND DERIVATIVES," by Tito Viswanathan, which is incorporated herein by reference in its entirety.

Some references, which may include patents, patent applications and various publications, are cited in a reference list and discussed in the description of this invention. The citation and/or discussion of such references is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

STATEMENT OF FEDERALLY-SPONSORED RESEARCH

The present invention was made with government support under Grant No. DE-FC 36-06 GO 86072 awarded by U.S. Department of Energy (DOE). The government has certain rights in the invention.

FIELD OF THE INVENTION

The present invention relates generally to a method or process of synthesizing carbon-magnetite nanocomposites, and more particularly to a microwave-assisted method or process of synthesizing carbon-magnetite nanocomposites, and applications of same.

BACKGROUND

The removal of arsenic (As), a heavy metal ion present in water supplies world-wide, is important for several reasons. Studies have indicated that the deleterious effects of exposure to even small doses of arsenic can be cumulative and may lead to cancer, such as skin cancer, lung cancer, bladder cancer, and kidney cancer, as well as immunological and neurological problems. Several countries in the world, for example, Bangladesh, India, Mexico and the United States to name a few, have naturally-occurring high As levels in drinking water. The seriousness of the problem is exemplified by the new worldwide requirement of As level at no more than 10 mg/L for drinking water (down from 50 mg/L prior to 1993) by the World Health Organization (WHO) [1] and the adoption of the same requirement by United States Environmental Protection Agency (USEPA) (40 CFR Part 141) in January of 2006.

Work done by researchers including those in the United States have shown that magnetite ($Fe_3O_4$) particles are very effective in reducing As concentration [as As (III) in Arsenite and as As (V) in Arsenate] from contaminated water. A detailed study of the adsorption of As to magnetite nanoparticles has been performed in terms of particle concentration, pH, ionic strength and temperature. The results suggest that As adsorption is not significantly affected by pH, ionic strength, and temperature ranges [2]. It has also been determined that magnetite particles in the nanodimension (<100 nm) dramatically increases the adsorption capacity of As removal [3]. A patent application on the use of an iron composition based water filtration system for the removal of chemical species containing arsenic and other metal cations and anions has been published [4]. A majority iron component combined with layers of sand, brick, chips, and charcoal was used to create a water filter for filtering inorganic arsenic species and other soluble metal ions out of water. A composite material containing a blend of activated carbon with a large specific area and iron oxide nanoparticles prepared in its presence has been used to remove arsenic in water. However, the procedures for the synthesis of magnetite nanoparticles reported so far in these references are rather tedious, time consuming and expensive.

Therefore, a heretofore unaddressed need exists in the art to address the aforementioned deficiencies and inadequacies.

SUMMARY OF THE INVENTION

In one aspect, the present invention provides a method of synthesizing carbon-magnetite nanocomposites. In one embodiment, the method includes the steps of (a) dissolving a first amount of an alkali salt of lignosulfonate in water to form a first solution, (b) heating the first solution to a first temperature, (c) adding a second amount of iron sulfate ($FeSO_4$) to the first solution to form a second solution, (d) heating the second solution at a second temperature for a first duration of time effective to form a third solution of iron lignosulfonate, (e) adding a third amount of 1N sodium hydroxide (NaOH) to the third solution of iron lignosulfonate to form a fourth solution with a first pH level, (f) heating the fourth solution at a third temperature for a second duration of time to form a first sample, and (g) subjecting the first sample to a microwave radiation for a third duration of time effective to form a second sample containing a plurality of carbon-magnetite nanocomposites.

In one embodiment, the alkali salt of lignosulfonate comprises calcium lignosulfonate or sodium lignosulfonate.

In one embodiment, the first temperature is about 90° C.

In one embodiment, the second temperature is about 90° C.

In one embodiment, the first duration of time is about one hour.

In one embodiment, the first pH level is about 9.0 or about 7.0.

In one embodiment, the third temperature is about 85° C.

In one embodiment, the method further includes the steps of, prior to the step of heating the fourth solution, (a) cooling the fourth solution to a fourth temperature, and (b) after the cooling step, filtering the fourth solution.

In one embodiment, the fourth temperature is lower than the second temperature and the third temperature.

In one embodiment, the method further includes the step of, prior to the subjecting step, drying the first sample in a vacuum oven at room temperature for a fourth duration of time.

In one embodiment, the method further includes the steps of, prior to the subjecting step (a) placing the first sample in a first container, and (b) placing a fourth amount of graphite or carbon black in the first container.

In one embodiment, the subjecting step includes the step of subjecting the first sample placed in the first container to the microwave radiation, the first container being positioned such that the fourth amount of graphite or carbon black is also subjected to the microwave radiation.

In one embodiment, the method further includes the steps of, prior to the subjecting step, (a) placing the first sample in a first container, and (b) placing the first container with the first sample in a second container that contains graphite or carbon black.

In another embodiment, the subjecting step includes the step of subjecting the first sample placed in the first container to the microwave radiation, the first container being placed in the second container, which is positioned such that at least part of the graphite or carbon black contained in the second container is also subjected to the microwave radiation.

In yet another embodiment, the method further includes the steps of, after the subjecting step, (a) mixing the second sample with water to obtain a fifth solution, and (b) heating the fifth solution to a temperature corresponding to the boiling point of the fifth solution for a fifth duration of time.

In a further embodiment, the second sample also contains iron carbide.

In another aspect, the present invention provides an article of manufacture made by the method set forth immediately above.

In another aspect, the present invention provides a method of synthesizing carbon-magnetite nanocomposites. In one embodiment, the method includes the steps of (a) dissolving a first amount of tannin and a second amount of ferric chloride ($FeCl_3$) in water to form a first solution, the water having a temperature higher than room temperature, (b) adding a third amount of 1N sodium hydroxide (NaOH) to the first solution to form a second solution with a first pH level, (c) centrifuging the second solution to form a first sample, and (d) subjecting the first sample to a microwave radiation for a first duration of time effective to form a second sample containing a plurality of carbon-magnetite nanocomposites.

In one embodiment, the ratio of the first amount of tannin and the second amount of ferric chloride ($FeCl_3$) is such that about one mole equivalent of ferric chloride ($FeCl_3$) is added to about 288 g of tannin.

In another embodiment, the first pH level is about 9.0.

In yet another embodiment, the method further includes the step of, prior to the centrifuging step, cooling the second solution to room temperature.

In a further embodiment, the method further includes the step of, prior to the subjecting step, drying the first sample.

In another aspect, the present invention provides an article of manufacture made by the method set forth immediately above.

In another aspect, the present invention provides a method of synthesizing carbon-transition-metal-oxide nanocomposites. In one embodiment, the method includes the steps of (a) dissolving a first amount of an alkali salt of lignosulfonate in water to form a first solution, (b) heating the first solution to a first temperature, (c) adding a second amount of transition-metal sulfate to the first solution to form a second solution, (d) heating the second solution at a second temperature for a first duration of time effective to form a third solution of transition-metal lignosulfonate, (e) adding a third amount of 1N sodium hydroxide (NaOH) to the third solution of transition-metal lignosulfonate to form a fourth solution with a first pH level, (f) heating the fourth solution at a third temperature for a second duration of time to form a first sample, and (g) subjecting the first sample to a microwave radiation for a third duration of time effective to form a second sample containing a plurality of carbon-transition-metal-oxide nanocomposites.

In another embodiment, the transition-metal comprises one of Fe, Co, and Ni.

In yet another embodiment, the alkali salt of lignosulfonate comprises calcium lignosulfonate or sodium lignosulfonate.

In yet another aspect, the present invention provides an article of manufacture made by the method set forth immediately above.

In a further aspect, the present invention provides a method of removing arsenic from contaminated water. In one embodiment, the method includes the steps of (a) adding an amount of carbon-magnetite nanocomposites to contaminated water that contains arsenic ions to form a solution, (b) subjecting the solution to an ultrasound wave for a duration of time effective to allow a plurality of arsenic ions to be adsorbed on at least some of the carbon-magnetite nanocomposites, and (c) removing the carbon-magnetite nanocomposites from the solution.

In another embodiment, the removing step includes the step of filtering the solution to remove the carbon-magnetite nanocomposites from the solution.

In yet another embodiment, the removing step includes the step of removing the carbon-magnetite nanocomposites from the solution by applying a magnetic field.

These and other aspects of the present invention will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The drawings described below are for illustration purposes only. The drawings are not intended to limit the scope of the present teachings in any way. The patent or application file may contain at least one drawing executed in color. If so, copies of this patent or patent application publication with color drawing(s) will be provided by the Office upon request and payment of the necessary fee.

DETAILED DESCRIPTION

Figure 1:
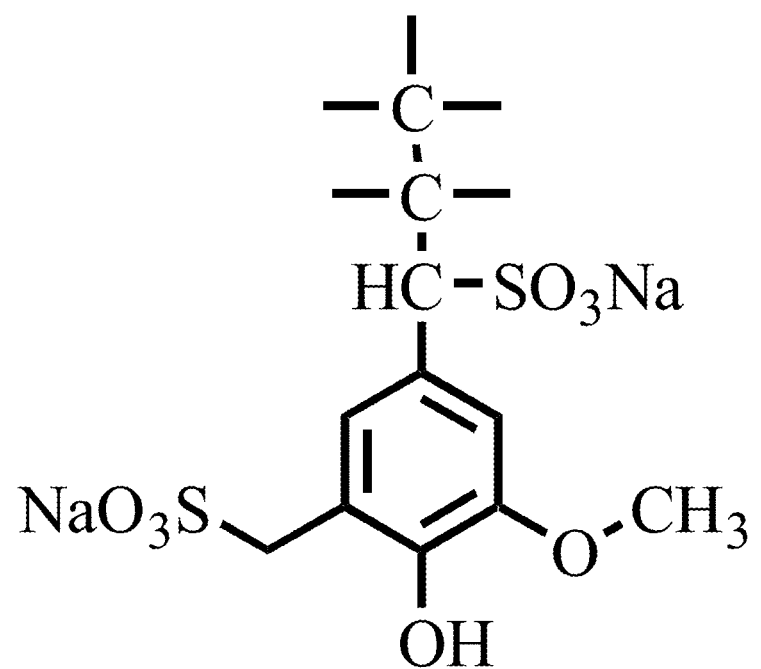
FIG. 1 shows a typical sulfonated/sulfomethylated lignin monomer unit.

The present invention is more particularly described in the following examples that are intended as illustrative only since numerous modifications and variations therein will be apparent to those skilled in the art. Various embodiments of the invention are now described in detail. Referring to the drawings, FIGS. 1-7, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention. Additionally, some terms used in this specification are more specifically defined below.

Definitions

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

Unless otherwise defined, all technical and scientific terms used herein have the same meaning as commonly understood by one of ordinary skill in the art to which this invention pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "scanning electron microscope (SEM)" refers to a type of electron microscope that images the sample surface by scanning it with a high-energy beam of electrons in a raster scan pattern. The electrons interact with the atoms that make up the sample producing signals that contain information about the sample's surface topography, composition and other properties such as electrical conductivity.

As used herein, the term "X-ray diffraction (XRD)" refers to one of X-ray scattering techniques that are a family of non-destructive analytical techniques which reveal information about the crystallographic structure, chemical composition, and physical properties of materials and thin films. These techniques are based on observing the scattered intensity of an X-ray beam hitting a sample as a function of incident and scattered angle, polarization, and wavelength or energy. In particular, X-ray diffraction finds the geometry or shape of a molecule, compound, or material using X-rays. X-ray diffraction techniques are based on the elastic scattering of X-rays from structures that have long range order. The most comprehensive description of scattering from crystals is given by the dynamical theory of diffraction.

As used herein, "nanoscopic-scale," "nanoscopic," "nanometer-scale," "nanoscale," "nanocomposites," "nanoparticles," the "nano-" prefix, and the like generally refers to elements or articles having widths or diameters of less than about 1 µm, preferably less than about 100 nm in some cases. In all embodiments, specified widths can be smallest width (i.e. a width as specified where, at that location, the article can have a larger width in a different dimension), or largest width (i.e. where, at that location, the article's width is no wider than as specified, but can have a length that is greater).

As used herein, "plurality" means two or more.

As used herein, the terms "comprising," "including," "carrying," "having," "containing," "involving," and the like are to be understood to be open-ended, i.e., to mean including but not limited to.

OVERVIEW OF THE INVENTION

The removal of arsenic (As), a heavy metal ion present in water supplies world-wide, is important for several reasons. Studies have indicated that the deleterious effects of exposure to even small doses of arsenic can be cumulative and may lead to cancer, such as skin cancer, lung cancer, bladder cancer, and kidney cancer, as well as immunological and neurological problems. Several countries in the world, for example Bangladesh, India, Mexico and the United States to name a few, have naturally-occurring high As levels in drinking water. The seriousness of the problem is exemplified by the new worldwide requirement of As level at no more than 10 mg/L for drinking water (down from 50 mg/L prior to 1993) by the World Health Organization (WHO)[1] and the adoption of the same requirement by United States Environmental Protection Agency (USEPA) (40 CFR Part 141) in January of 2006.

Work done by researchers including those in the United States have shown that magnetite ($Fe_3O_4$) particles are very effective in reducing As concentration [as As (III) in Arsenite and as As (V) in Arsenate] from contaminated water. A detailed study of the adsorption of As to magnetite nanoparticles has been performed in terms of particle concentration, pH, ionic strength and temperature. The results suggest that As adsorption is not significantly affected by pH, ionic strength, and temperature ranges [2]. It has also been determined that magnetite particles in the nanodimension (<100 nm) dramatically increases the adsorption capacity of As removal [3]. A patent application on the use of an iron composition based water filtration system for the removal of chemical species containing arsenic and other metal cations and anions has been reported [4]. A majority iron component combined with layers of sand, brick, chips, and charcoal was used to create a water filter for filtering inorganic arsenic species and other soluble metal ions out of water. A composite material containing a blend of activated carbon with a large specific area and iron oxide nanoparticles prepared in its presence has been used to remove arsenic in water. However, the procedures for the synthesis of magnetite nanoparticles reported in these studies and patents are rather tedious, time consuming and expensive.

In one aspect, the present invention provides a method of synthesizing carbon-magnetite nanocomposites using materials derived from renewable resources that is simple, quick, and inexpensive. The carbon-magnetite nanocomposites made by this method are proven to be highly effective in removing arsenic ions from contaminated water. Also, the presence of carbon would afford properties not present in magnetite particles alone. This would include the removal of polynuclear aromatics and chlorinated hydrocarbons from contaminated water.

Carbon-metal-oxide nanocomposites are synthesized by subjecting metal salts of lignin or tannin to a microwave radiation. The microwave radiation could be provided by a domestic kitchen microwave oven such as a 900 W microwave oven operating at 2.45 GHz or an industry microwaving facility with proper operating parameters. The metals used are those that are magnetic in their elemental form or in their oxide form such as iron, cobalt, and nickel.

Lignin and Sources

Lignin, the major non-cellulosic constituent of wood, is a complex phenolic polymer that bears a superficial resemblance to phenol-formaldehyde resins. It consists of functionalized phenylpropane units connected via alkyl and aryl ether linkages. Essentially, all of the lignin commercially available is isolated as by-products from the paper industry from either the sulfite or the Kraft process.

Sulfonated lignins are obtained either as spent sulfite liquor (SSL) or by sulfonation of lignin obtained from the Kraft process. SSL obtained from the sulfite process consists of lignosulfonates (about 55%), sugars (30%), and other ingredients in smaller amounts. FIG. 1 shows a typical monomeric unit of Kraft lignin that has been sulfomethylated at the aromatic ring and sulfonated on the aliphatic side chain. Sulfomethylation is accomplished by the reaction of the Kraft lignin with formaldehyde and sodium sulfite. The aliphatic sulfonation occurs preferentially at the benzylic position of the side chain of the phenylpropane units. Lignosulfonates are available in the form of calcium or sodium salts (Borasperse® and Ultrazine® from Mead Westvaco, for example) and are cheaper alternatives to other forms of lignosulfonates. Lignotech's calcium salt of lignosulfonic acid [Borresperse-CA] is especially suitable for the synthesis of metal-carbon nanocomposites. Some of the applications of lignosulfonates are in concrete admixtures, animal feed, oil-well drilling mud, dust control, emulsion stabilizers, dye dispersants, wood preservation, and mining aids. Almost a million metric tones of lignosulfonate is produced every year and the major manufacturers and their annual production is published.

Mead Westvaco and LignoTech USA are two of the major manufacturers of lignosulfonates in the U.S. A variety of sulfonated lignin products are available from them. The sulfonation can be controlled to occur either at the aromatic ring or the benzylic position or both. The degree and position of sulfonation can affect the final property and potential application of the lignin.

Tannin and Sources

Figure 2:
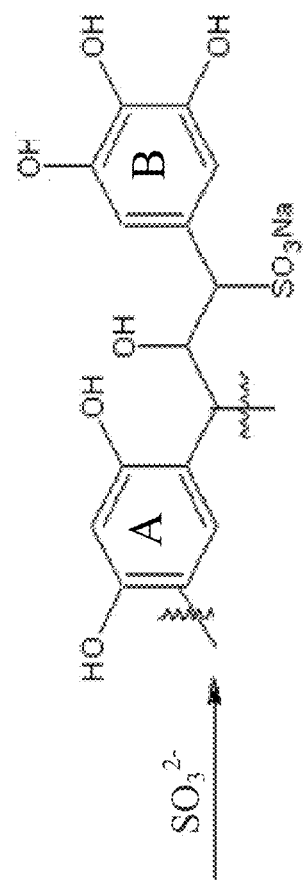
FIG. 2 shows a reaction scheme for the sulfonation of a monomeric unit of a condensed tannin.
Figure 2:
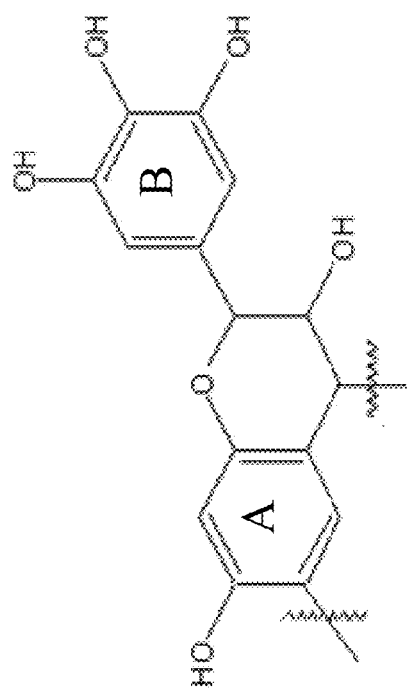
Figure 3:
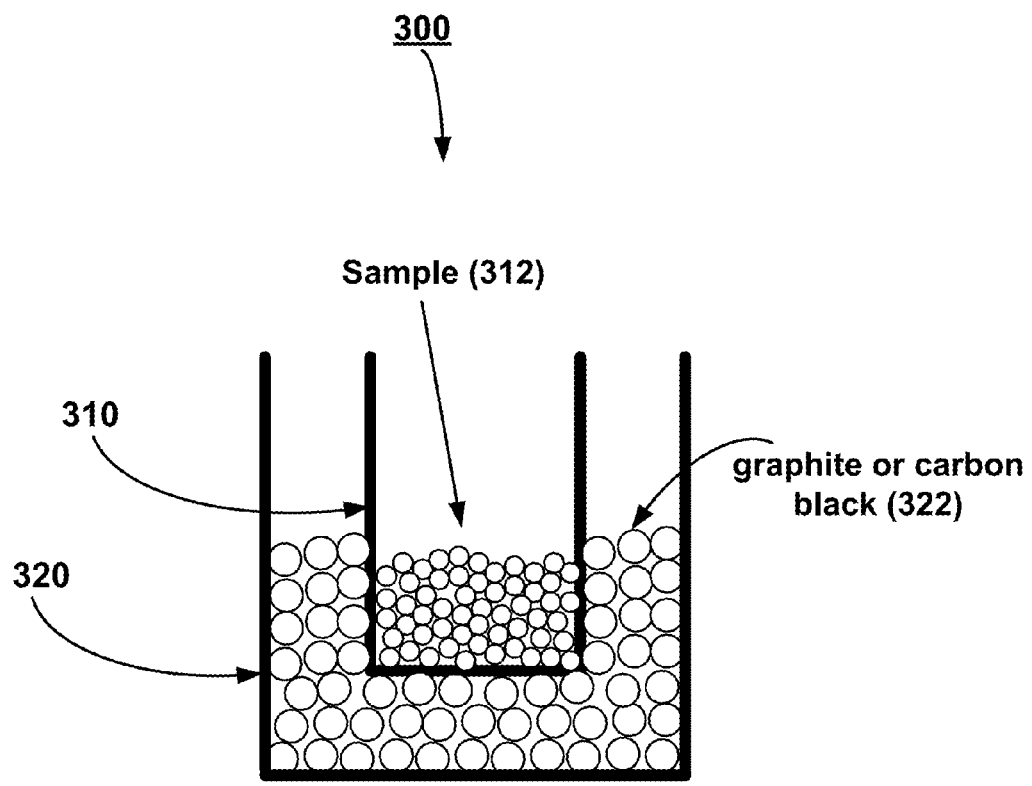
FIG. 3 shows schematically an assembly in part according to one embodiment of the present invention.

Tannins are naturally occurring polyphenols that are found in the vascular tissue of plants such as the leaves, bark, grasses, and flowers. They are classified into two groups: condensed tannins and hydrolysable tannins FIG. 2 illustrates a reaction scheme for the sulfonation of monomeric unit of a condensed tannin. The corresponding molecular structure consists of three rings: two benzene rings on either side of an oxygen-containing heterocyclic ring. The A-ring to the left of the cyclic ether ring consists of one or two hydroxyl groups. The B-ring present on the right of the cyclic ether ring also consists of two or three hydroxyl groups.

A particular tannin of interest is Quebracho tannin. This tannin is obtained from the hot water extraction of the heartwoods of Schinopsis balansae and lorentzii, indigenous to Argentina and Paraguay. Quebracho accounts for 30% of the dry weight of the heartwoods with a production level averaging 177,000 tons per year over the past 30 years, according to the Tannin Corporation, Peabody, Mass. In addition to unmodified hot water-soluble tannins, cold water soluble sulfonated tannins are commercially available and represent an inexpensive renewable resource. For example, Chevron Philips Company in Bartlesville, Okla. supplies tannins with different degrees of sulfonation. The material safety data sheets (MSDSs) and technical data sheets providing the structure and percentage of sulfur in the products are also provided. Sold under the trade name of "Orform" tannins, these represent an alternate source of a sulfonated renewable resource that could be compared to sulfonated lignins.

Thus, in one aspect, the present invention provides a method of synthesizing carbon-magnetite nanocomposites. In one embodiment, the method includes the steps of (a) dissolving a first amount of an alkali salt of lignosulfonate in water to form a first solution, (b) heating the first solution to a first temperature, (c) adding a second amount of iron sulfate ($FeSO_4$) to the first solution to form a second solution, (d) heating the second solution at a second temperature for a first duration of time effective to form a third solution of iron lignosulfonate, (e) adding a third amount of 1N sodium hydroxide (NaOH) to the third solution of iron lignosulfonate to form a fourth solution with a first pH level, (f) heating the fourth solution at a third temperature for a second duration of time to form a first sample, and (g) subjecting the first sample to a microwave radiation for a third duration of time effective to form a second sample containing a plurality of carbon-magnetite nanocomposites.

In one embodiment, the alkali salt of lignosulfonate comprises calcium lignosulfonate or sodium lignosulfonate.

In one embodiment, the first temperature is about 90° C.

In one embodiment, the second temperature is about 90° C.

In one embodiment, the first duration of time is about one hour.

In one embodiment, the first pH level is about 9.0 or about 7.0.

In one embodiment, the third temperature is about 85° C.

In one embodiment, the method further includes the steps of, prior to the step of heating the fourth solution, (a) cooling the fourth solution to a fourth temperature, and (b) after the cooling step, filtering the fourth solution.

In one embodiment, the fourth temperature is lower than the second temperature and the third temperature.

In one embodiment, the method further includes the step of, prior to the subjecting step, drying the first sample in a vacuum oven at room temperature for a fourth duration of time.

In one embodiment, the method further includes the steps of, prior to the subjecting step (a) placing the first sample in a first container, and (b) placing a fourth amount of graphite or carbon black in the first container.

In one embodiment, the subjecting step includes the step of subjecting the first sample placed in the first container to the microwave radiation, the first container being positioned such that the fourth amount of graphite or carbon black is also subjected to the microwave radiation.

In one embodiment, the method further includes the steps of, prior to the subjecting step, (a) placing the first sample in a first container, and (b) placing the first container with the first sample in a second container that contains graphite or carbon black.

In another embodiment, the subjecting step includes the step of subjecting the first sample placed in the first container to the microwave radiation, the first container being placed in the second container, which is positioned such that at least part of the graphite or carbon black contained in the second container is also subjected to the microwave radiation.

In yet another embodiment, the method further includes the steps of, after the subjecting step, (a) mixing the second sample with water to obtain a fifth solution, and (b) heating the fifth solution to a temperature corresponding to the boiling point of the fifth solution for a fifth duration of time.

In a further embodiment, the second sample also contains iron carbide.

In another aspect, the present invention provides an article of manufacture made by the method set forth immediately above.

In another aspect, the present invention provides a method of synthesizing carbon-magnetite nanocomposites. In one embodiment, the method includes the steps of (a) dissolving a first amount of tannin and a second amount of ferric chloride ($FeCl_3$) in water to form a first solution, the water having a temperature higher than room temperature, (b) adding a third amount of 1N sodium hydroxide (NaOH) to the first solution to form a second solution with a first pH level, (c) centrifuging the second solution to form a first sample, and (d) subjecting the first sample to a microwave radiation for a first duration of time effective to form a second sample containing a plurality of carbon-magnetite nanocomposites.

In one embodiment, the ratio of the first amount of tannin and the second amount of ferric chloride ($FeCl_3$) is such that about one mole equivalent of ferric chloride ($FeCl_3$) is added to about 288 g of tannin.

In another embodiment, the first pH level is about 9.0.

In yet another embodiment, the method further includes the step of, prior to the centrifuging step, cooling the second solution to room temperature.

In a further embodiment, the method further includes the step of, prior to the subjecting step, drying the first sample.

In another aspect, the present invention provides an article of manufacture made by the method set forth immediately above.

In another aspect, the present invention provides a method of synthesizing carbon-transition-metal-oxide nanocomposites. In one embodiment, the method includes the steps of (a) dissolving a first amount of an alkali salt of lignosulfonate in water to form a first solution, (b) heating the first solution to a first temperature, (c) adding a second amount of transition-metal sulfate to the first solution to form a second solution, (d) heating the second solution at a second temperature for a first duration of time effective to form a third solution of transition-metal lignosulfonate, (e) adding a third amount of 1N sodium hydroxide (NaOH) to the third solution of transition-metal lignosulfonate to form a fourth solution with a first pH level, (f) heating the fourth solution at a third temperature for a second duration of time to form a first sample, and (g) subjecting the first sample to a microwave radiation for a third duration of time effective to form a second sample containing a plurality of carbon-transition-metal-oxide nanocomposites.

In another embodiment, the transition-metal comprises one of Fe, Co, and Ni.

In yet another embodiment, the alkali salt of lignosulfonate comprises calcium lignosulfonate or sodium lignosulfonate.

In yet another aspect, the present invention provides an article of manufacture made by the method set forth immediately above.

In a further aspect, the present invention provides a method of removing arsenic from contaminated water. In one embodiment, the method includes the steps of (a) adding an amount of carbon-magnetite nanocomposites to contaminated water that contains arsenic ions to form a solution, (b) subjecting the solution to an ultrasound wave for a duration of time effective to allow a plurality of arsenic ions to be adsorbed on at least some of the carbon-magnetite nanocomposites, and (c) removing the carbon-magnetite nanocomposites from the solution.

In another embodiment, the removing step includes the step of filtering the solution to remove the carbon-magnetite nanocomposites from the solution.

In yet another embodiment, the removing step includes the step of removing the carbon-magnetite nanocomposites from the solution by applying a magnetic field.

Additional details are set forth below.

EXAMPLES

Aspects of the present teachings may be further understood in light of the following examples, which should not be construed as limiting the scope of the present teachings in any way.

Example 1

Synthesis of Carbon Particles from Lignin, Tannin, Lignosulfonate, or Tanninsulfonate In a typical preparation of carbon particles from lignin, tannin, lignosulfonate, tanninsulfonate, or mixtures thereof, according to one embodiment of the present invention, one gram of the wood byproduct is treated with four drops of 85% phosphoric acid and mixed thoroughly using a mortar and pestle to form a sample 312. The sample 312 is then placed in a first container, such as a test tube 310, and placed vertically inside a second container, such as a beaker 320, as shown schematically in FIG. 3. Optionally, graphite or carbon black 322 may be placed in the beaker 320 as a carbon jacket to raise the temperature of the sample 312 more rapidly in the microwave. The whole assembly 300 is placed inside a microwave-oven under the hood. The oven is then turned on for a duration of about 4 minutes. The sample sparks and then turns red, glowing during the entire process. The sample 312 may then be optionally heated further or the reaction may be terminated. The resulted black sample is then powdered using a mortar and pestle and then introduced in a Erlenmeyer flask. A 100 mL aliquot of deionized (DI) water is brought to boil while stirring. The solution is then cooled to room temperature and filtered through a coarse filter paper. Residue is washed with 4×100 mL of DI water and then dried on the filter paper via suction. It is then dried further in a vacuum oven at room temperature overnight.

Example 2

Synthesis of Carbon-magnetite Nanocomposites from Lignin

In a typical preparation of carbon-magnetite nanocomposites from lignin, according to one embodiment of the present invention, a lignosulfonate calcium salt is converted to the desired iron lignosulfonate, which is in turn converted to lignin magnetite composite prior to carbonization.

A 10 g sample of calcium lignosulfonate, which has 5% $Ca^{2+}$ (0.0125 mol Ca ions), is added to 70 mL of DI water and heated to 90° C. with stirring. A 0.0125 mol sample of iron sulfate ($FeSO_4$) is then added to the solution and the reaction mixture is heated for one hour at 90° C. The iron lignosulfonate is treated with 1N NaOH to pH 7.0 or pH 9.0. The solution is then cooled and filtered through a coarse filter paper. The filtrate is then heated at 85° C. until the water evaporates. It is then furthered dried in a vacuum oven overnight at room temperature. Typical yield is around 85-90%.

The dried material is then subjected to microwave radiation using a 900 Watt microwave oven placed under a hood for about 2 minutes. The material is then subjected to 4 additional minutes of microwave treatment. Optionally a small amount of microwave absorber, such as carbon black or graphite, may be added to accelerate the carbonization process. Another option is to use a carbon jacket, as utilized in Example 1, to raise the temperature of the lignin more rapidly in the microwave. This is done by placing the material 312 in a first container 310, and placing the first container 310 in a second container 322 that contains carbon black or graphite 322 as shown schematically in FIG. 3, and then placing the whole assembly 300 in the microwave oven. The time for microwave treatment is around 4 minutes until the sample releases no more observable smoke. The sample is cooled and introduced into a mortar and pestle and powdered. The sample is treated in boiling water for 10 minutes and cooled and filtered through suction. It is then washed with 4×100 mL of DI water and dried on the filter paper under suction. It is further dried in a vacuum oven in room temperature overnight.

The conversion of iron lignosulfonate to magnetite in presence of alkali renders it to become an excellent microwave absorber. The heat generated is sufficient to carbonize the lignin and to convert some of the iron to iron carbide.

In an alternative embodiment, instead of using calcium salt of lignin, sodium salts of lignin in presence of iron salts may be used as starting materials for the preparation of carbon-magnetite nanocomposite. In yet other alternative embodiments, other metal salts, such as cobalt or nickel salts, can be used in place of iron sulfate to produce other metal oxide nanocomposites.

Example 3

Synthesis of Carbon-magnetite Nanocomposites from Tannin

Carbon-magnetite nanocomposites may also be prepared using tannin as the carbon source, according to one embodiment of the present invention. Tannin and ferric chloride are dissolved in a small amount of hot water. The ration of tannin to ferric chloride is such that 1 mole equivalent of ferric chloride was added to 288 g of tannin (corresponding to the unit weight for tannin) Sufficient 1N NaOH was added till the pH was 9.0. The solution was cooled and then centrifuged to yield magnetite-tannin composite. The material was dried in an oven and the solid was powdered. The dried powder was microwaved using one of the methods described earlier for lignin and purified using the same procedure described above.

Example 4

Characterization of Carbon-magnetite Nanocomposites

Figure 4:
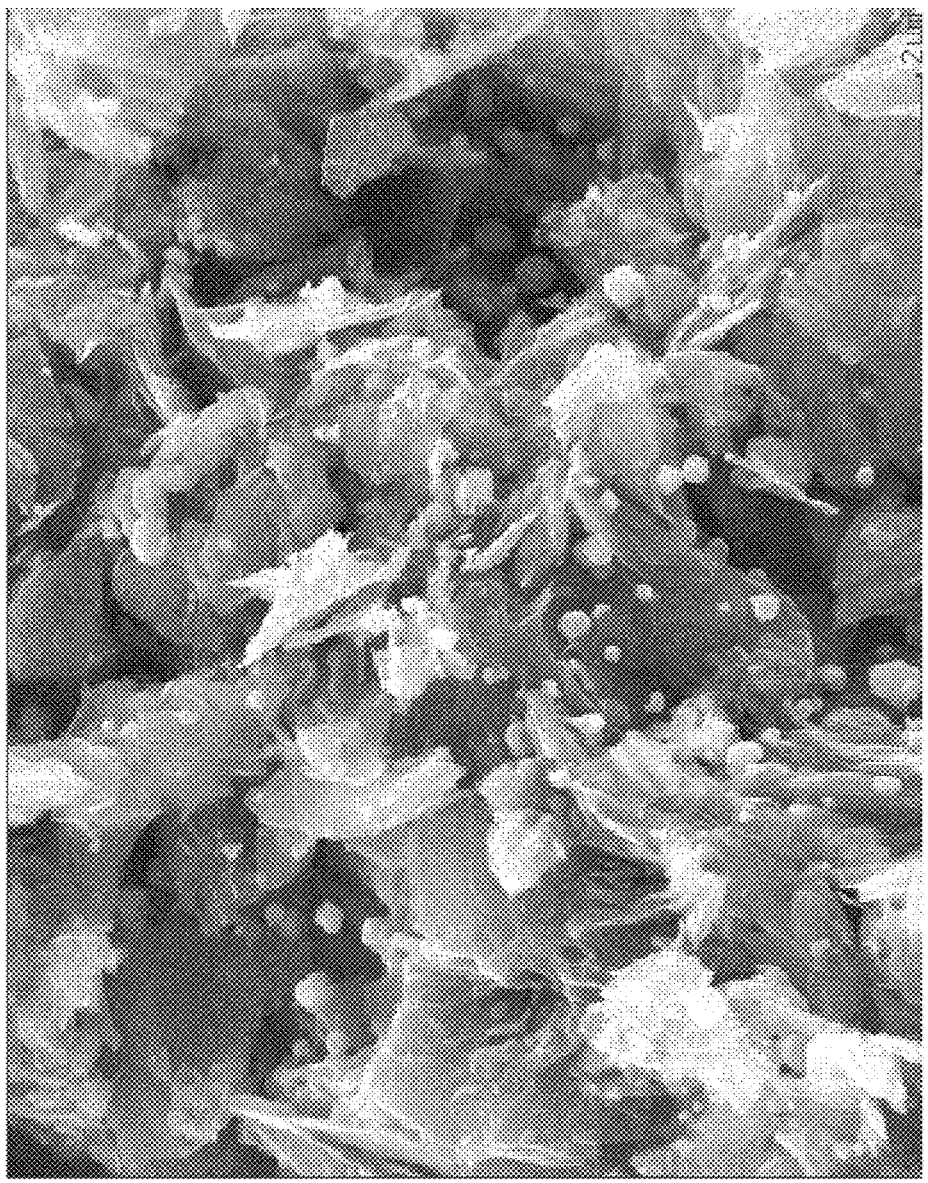
FIG. 4 shows an SEM image of the carbon-magnetite nanocomposites synthesized according to one embodiment of the present invention.

FIG. 4 shows an SEM image of the carbon-magnetite nanocomposites synthesized by the method described in Example 2. The magnetite nanoparticles are dispersed between graphite and amorphous carbon.

Figure 5:
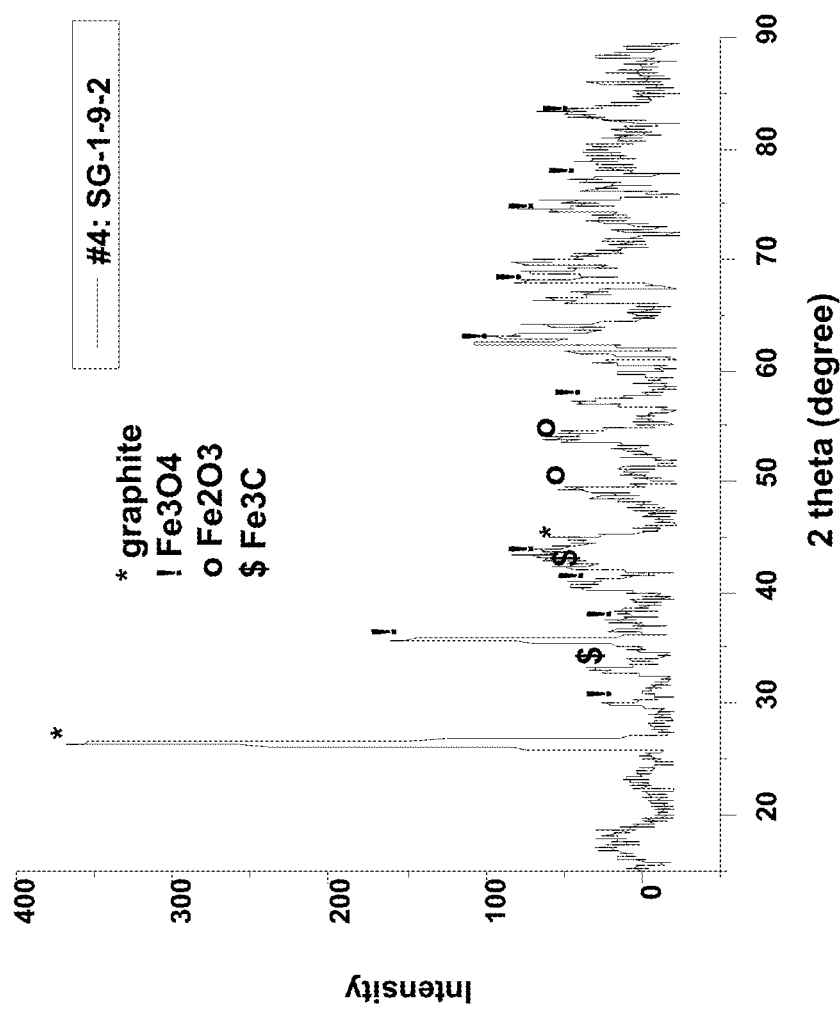
FIG. 5 shows an X-ray diffraction (XRD) pattern of the carbon-magnetite nanocomposites synthesized according to one embodiment of the present invention.

FIG. 5 shows an X-ray diffraction (XRD) pattern of the carbon-magnetite nanocomposites synthesized by the method described in Example 2. The XRD pattern confirms the presence of magnetite. The peak assignment shows that, in addition to carbon and magnetite, there is also $Fe_2O_3$ and iron carbide ($Fe_3C$) present in the sample. These magnetic species are also effective in arsenic remediation.

Example 5

As Remediation Using Carbon-magnetite Nanocomposites

The efficacy of the carbon-magnetite nanocomposite derived from lignin as well as tannin as sorbents for the removal of arsenic (As) from contaminated water was tested in the laboratory according to one embodiment of the present invention.

An aqueous solution containing 100 microgram per liter As ions, one at pH 7.0 and one at pH 9.0 was ultrasonically treated for an hour with varying amounts of the carbon-magnetite nanocomposites. The solution was then filtered using a 4 micron nylon filter using vacuum suction. The concentration of the remaining As ions in the solution after nanocomposite treatment was determined using an inductively coupled plasma mass spectroscopy (ICP-MS).

Figure 6:
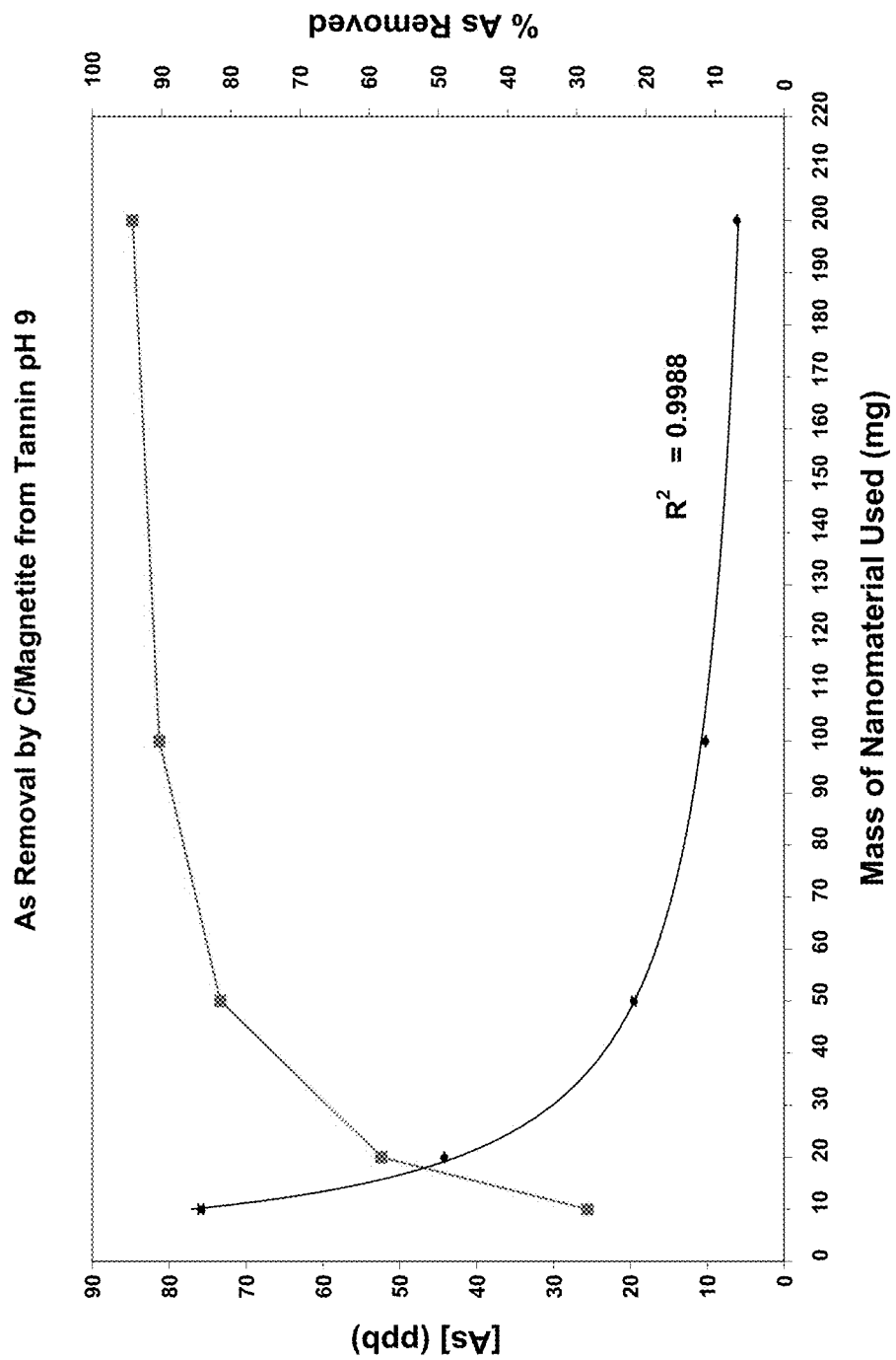
FIG. 6 shows typical results obtained from the treatment of 100 mL aqueous solution containing 100 microgram per liter of arsenic (As) with different amounts of carbon-magnetite nanocomposites according to one embodiment of the present invention. The curves show the remaining As (in parts per billion) as well as the % As removed, respectively.

FIG. 6 shows typical results obtained from the treatment of 100 mL aqueous solution containing 100 microgram per liter of As with different amounts of carbon-magnetite nanocomposites according to one embodiment of the present invention. The curves show the remaining As (in parts per billion) as well as the % As removed, respectively. These results demonstrate that the carbon-magnetite nanocomposites are effective for removal of As in contaminated water.

Figure 7:
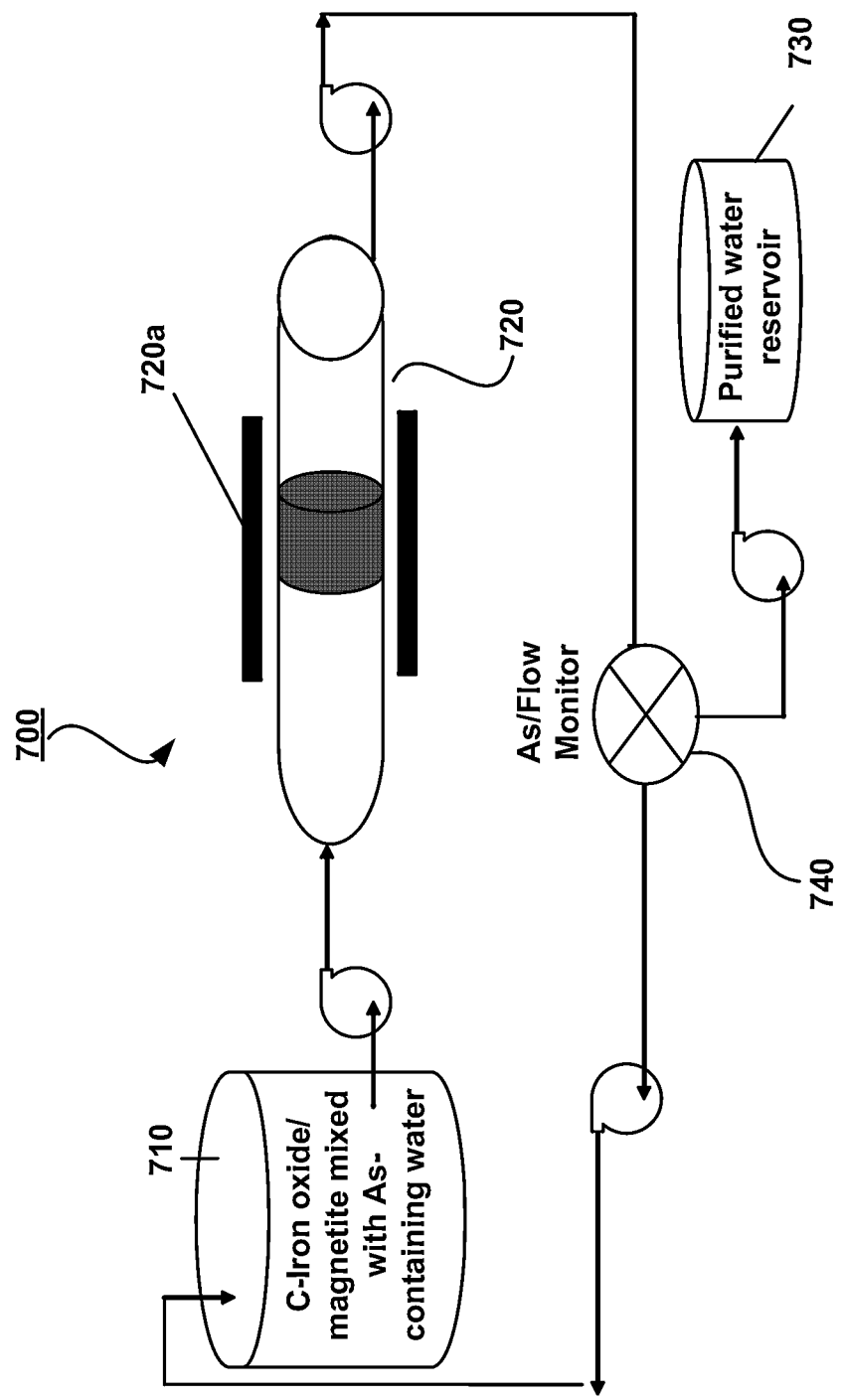
FIG. 7 shows a facility for removal of As from contaminated water using carbon-magnetite nanocomposites as sorbents according to one embodiment of the present invention.

FIG. 7 shows a facility 700 for removal of As from contaminated water using carbon-magnetite nanocomposites as sorbents according to one embodiment of the present invention. A certain amount of carbon-magnetite nanocomposites is mixed with As-contaminated water in a ultrasonic stirrer 710. After the treatment, the carbon-magnetite nanocomposites, some of which have arsenic ions adsorbed thereon, are removed from the water by passing the water through a filter 720. The filter 720 may comprise a magnet 720a for capturing the carbon-magnetite nanocomposites. Purified water is then stored in a reservoir 730. A monitor 740 can be strategically positioned to monitor the concentration of As in the treated water to determine whether the treated water is purified sufficient to be released to the reservoir 730.

Example 6

Use of Lignin-magnetite and Tannin-magnetite for Water Purification

Lignin-magnetite and tannin-magnetite, made according to one embodiment of the present invention, are also expected to function very effectively as sorbents for removal of As and other heavy metal ions from contaminated water. There is no need for microwaving in these applications. The product does not contain free carbon but is expected to have the desirable properties to remove carbonaceous materials as well as heavy metal ions from contaminated water.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

LIST OF REFERENCES

[1] Vaclavikova M, Gallios G P, Hredzak S, Jakabsky S, *Removal of arsenic from water streams: an overview of available techniques*, Clean Technologies and Environmental Policy (2008), 10(1), 89-95.

[2] Shipley H J, Yean S, Kan A T, Tomson M B, *Adsorption of arsenic to magnetite nanoparticles: effect of particle concentration, pH, ionic strength, and temperature*, Environmental Toxicology and Chemistry (2009), 28(3), 509-515.

[3] Mayo J T, Yavuz C, Yeah S, Cong L, Shipley H, Yu W, Falkner J, Kan A, Tomson M, Colvin V L, *The effect of nanocrystalline magnetite size on arsenic removal*, Science and Technology of Advanced Materials (2007), 8(1-2), 71-75.

[4] Hussam A, *An iron composition based water filtration system for the removal of chemical species containing arsenic and other metal cations and anions*, PCT Int. Appl. (2008), WO 2008127757 A2 20081023.

What is claimed is:

1. A method of synthesizing carbon-magnetite nanocomposites, comprising the steps of:
   (a) dissolving a first amount of an alkali salt of lignosulfonate in water to form a first solution;
   (b) heating the first solution to a first temperature;
   (c) adding an amount of iron sulfate ($FeSO_4$) to the first solution to form a second solution;
   (d) heating the second solution at a second temperature for a first duration of time effective to form a third solution of iron lignosulfonate;
   (e) adding an amount of 1N sodium hydroxide (NaOH) to the third solution of iron lignosulfonate to form a fourth solution with a first pH level;
   (f) heating the fourth solution at a third temperature for a second duration of time to form a first sample; and
   (g) subjecting the first sample to a microwave radiation for a third duration of time effective to form a second sample containing a plurality of carbon-magnetite nanocomposites.

2. The method of claim 1, wherein the alkali salt of lignosulfonate comprises calcium lignosulfonate or sodium lignosulfonate.

3. The method of claim 1, wherein the first temperature is about 90° C.

4. The method of claim 1, wherein the second temperature is about 90° C.

5. The method of claim 4, wherein the first duration of time is about one hour.

6. The method of claim 1, wherein the first pH level is about 9.0 or about 7.0.

7. The method of claim 1, wherein the third temperature is about 85° C.

8. The method of claim 1, further comprising the steps of, prior to the step of heating the fourth solution:
   (a) cooling the fourth solution to a fourth temperature; and
   (b) after the cooling step, filtering the fourth solution.

9. The method of claim 8, wherein the fourth temperature is lower than the second temperature and the third temperature.

10. The method of claim 1, further comprising the step of, prior to the subjecting step, drying the first sample in a vacuum oven at room temperature for a fourth duration of time.

11. The method of claim 1, further comprising the steps of, prior to the subjecting step:
    (a) placing the first sample in a first container; and
    (b) placing a fourth amount of graphite or carbon black in the first container.

12. The method of claim 11, wherein the subjecting step comprises the step of subjecting the first sample placed in the first container to the microwave radiation, wherein the first container is positioned such that the fourth amount of the graphite or carbon black is also subjected to the microwave radiation.

13. The method of claim 1, further comprising the steps of, prior to the subjecting step:
    (a) placing the first sample in a first container; and
    (b) placing the first container with the first sample in a second container that contains graphite or carbon black.

14. The method of claim 13, wherein the subjecting step comprises the step of subjecting the first sample placed in the first container to the microwave radiation, wherein the first container is placed in the second container, which is positioned such that at least part of the graphite or carbon black contained in the second container is also subjected to the microwave radiation.

15. The method of claim 1, further comprising the steps of, after the subjecting step:
   (a) mixing the second sample with water to obtain a fifth solution; and
   (b) heating the fifth solution to a temperature corresponding to the boiling point of the fifth solution for a fifth duration of time.

16. The method of claim 1, wherein the second sample also contains iron carbide.

17. A method of synthesizing carbon-transition-metal-oxide nanocomposites, comprising the steps of:
   (a) dissolving a first amount of an alkali salt of lignosulfonate in water to form a first solution;
   (b) heating the first solution to a first temperature;
   (c) adding an amount of transition-metal sulfate to the first solution to form a second solution;
   (d) heating the second solution at a second temperature for a first duration of time effective to form a third solution of transition-metal lignosulfonate;
   (e) adding an amount of 1N sodium hydroxide (NaOH) to the third solution of transition-metal lignosulfonate to form a fourth solution with a first pH level;
   (f) heating the fourth solution at a third temperature for a second duration of time to form a first sample; and
   (g) subjecting the first sample to a microwave radiation for a third duration of time effective to form a second sample containing a plurality of carbon-transition-metal-oxide nanocomposites.

18. The method of claim 17, wherein the transition-metal comprises one of Fe, Co, and Ni.

19. The method of claim 17, wherein the alkali salt of lignosulfonate comprises calcium lignosulfonate or sodium lignosulfonate.

* * * * *